2,785,125

DRILLING MUDS

Richard A. Salathiel, Houston, Tex., assignor, by mesne assignments, to Esso Research and Engineering Company, Elizabeth, N. J., a corporation of Delaware No Drawing. Application October 17, 1955,
Serial No. 541,090

11 Claims. (Cl. 252—8.5)

The present invention is directed to a suspension of finely divided solids in an aqueous medium for use in well drilling operations. More particularly, the invention is directed to a drilling mud having a low filtration rate. In its more specific aspects, the invention is directed to a drilling mud to which has been added materials for reducing filtration rate.

The present invention may be briefly described as involving a drilling mud comprising at least 5% by weight of finely divided solids in an aqueous medium to which has been added about 1 to 15 pounds of starch per 42 gallon barrel of mud and about 0.5 to 10 pounds per 42 gallon barrel of mud of a water soluble heat degradation product of a saccharide containing 1 to 4 combined sugar units.

In the rotary method of drilling boreholes, a flowable aqueous suspension of finely divided solids, commonly referred to as a drilling mud, is pumped down the drill stem through the openings in the drill bit and upwardly through the annular space betwen the drill stem and the wall of the borehole to the surface of the earth. A primary purpose for employing the drilling mud is to pick up the cuttings produced by the drill bit and to transport these cuttings to the surface of the earth. The drilling mud also serves other important functions such as lubricating the bit and the drill stem, cooling the bit, and furnishing a hydrostatic pressure head to prevent flow into the borehole of formation fluid, such as oil, gas, and water, from the various strata penetrated by the drill bit. In certain cases it is highly desirable that the mud form a thin, difficultly permeable coating or filter cake on the walls of the borehole for the purpose of reducing loss of water from the borehole to the formation and thereby reducing softening of the borehole walls and caving into the drill hole. It is preferable that the filter cake formed on the walls of the borehole be thin rather than thick so as to avoid mechanical difficulties in moving the bit in and out of the hole and in placing casing in the hole.

The aqueous suspensions of finely divided solids employed as drilling fluids in rotary drilling operations are sometimes prepared by admixing suitable amounts of commercial clay with water. Heavy materials such as barytes, iron oxide, barium sulfate, calcium carbonate, silica, and the like are often added to such a suspension in order to increase its specific gravity. In many cases, however, the drilling fluid used in oil and gas wells may be obtained by forming a suspension in water of surface clay at or adjacent the well site or may be prepared in the process of drilling by dispersing in water the cuttings produced from the borehole. Weighting materials, clays, and chemicals may, of course, be added to the drilling fluid prepared in the last mentioned manner.

Almost any fluid will perform some of the aforementioned functions, such, for example, as cooling the drill bit, but to perform some of the other functions, it is necessary that the drilling fluid employed possess certain very definite properties. For example, a drilling mud may have sufficient gel strength to prevent settling of solids from the mud when circulation of the mud is stopped, but, at the same time, its other properties may be such as to result in the deposition of a thick filter cake on the borehole walls rather than the preferred thin cake. When large amounts of water filter from the mud into the formations surrounding the borehole, the solids content of the mud remains as a filter cake on the wall of the hole, reducing the size of the annular passage. Sloughing of such a thick filter cake may case the drill pipe to become stuck. On the other hand, the employment of a drilling fluid having a low filtration rate restricts to a relatively small amount the water that can escape from the mud under the pressure differential prevailing in the borehole. A small loss of water from the mud to the formation means, of course, that only a thin filter cake will be deposited on the borehole walls. Use of the proper mud will help to preserve the borehole walls intact.

Occasionally, drilling muds which have a relatively low filtration rate may be prepared from borehole cuttings; however, it has generally been found necessary to incorporate filtration reducing agents into the mud to impact this desirable property thereto. It is common practice to employ starches for this purpose and, while the addition of starch has proved beneficial, there has been much to be desired in the way of performance, particularly with respect to the reduction of filtration rate when the aqueous medium is an aqueous saline medium.

It is, therefore, an object of the present invention to provide a dispersion or suspension of finely divided solid material in an aqueous saline medium having little tendency to lose water by filtration therefrom. Another object of the present invention is to provide a drilling fluid suitable for use in the rotary drilling of boreholes into subsurface formations and having a low filtration rate.

Another object of the present invention is to provide an agent which, on addition to the aqueous, saline drilling fluid used in the drilling of boreholes into subsurface formations, will substantially reduce the loss of water therefrom by filtration.

A further object of the present invention is to provide an agent which, on addition to a drilling fluid, will substantially reduce the loss of water therefrom by filtration, but which will not increase excessively the viscosity of the fluid or substantially affect its ability to maintain solids in suspension.

The present invention may be described as relating to a drilling mud composition, a method of preparing said drilling mud composition and a well drilling process employing the drilling mud composition of the present invention.

The composition of the present invention comprises an aqueous vehicle having dispersed or suspended therein at least 5% by weight of a finely divided solid material into which has been added starch and a water soluble heat degradation product of a saccharide containing 1 to 4 combined sugar units, the starch and heat degradation product being added in amounts sufficient to substantially reduce the tendency of the composition to lose water by filtration.

The finely divided solid material of the composition of my invention may, of course, be any finely divided solid which is capable of being dispersed or suspended in an aqueous liquid vehicle, and an example of such a dispersion or suspension is the drilling fluid used in rotary drilling of boreholes, which may include various solid materials. The finely divided solid material employed in the practice of the present invention will ordinarily include clay, such as colloidal clay bodies. For example, I may use in my drilling mud or aqueous suspension, colloidal clays, such as Wyoming bentonite, El Paso surface clay, medium yield drilling clays from Texas, clays containing the montmorillonites and especially sodium montmorillonite. The calcium montmorillonite clays may be employed and clays containing other suitable cationic combinations of the montmorillonites may be used. Sodium montmorillonite such as that encountered in Wyoming bentonite is included in the preferred type of clay. I also contemplate that I may use in the practice of my invention muds such as those produced when clayey subsurface formations are drilled. For example, mud such as that obtained from a drilling well in Lake Raccourci in Louisiana may be found entirely suitable. Likewise, I may employ in my invention dried ground shale such as has been obtained from a well in West Cote Blanche Bay in southern Louisiana. The solids portion of the mud may also contain weighting agents such as barytes, iron oxide, barium sulfate, calcium carbonate, silica, etc. and other conventional modifying agents including, for example, pH control agents, dispersants, etc. such as water soluble carbonates, phosphates, borates, etc. The amount of clay and other finely divided solids to be used may range from about 5% by weight of the mud up to as high as about 75% by weight.

The drilling muds of the present invention should also contain starch and a water soluble heat degradation product of a saccharide containing 1 to 4 sugar units. The heat degradation product may be derived from any suitable mono-, di-, tri-, or tetra-saccharide such as dextrose, sucrose, levulose, lactose, maltose, etc., or mixtures thereof. The heat degradation may be accomplished by heating the saccharide per se, at a temperature of about 375° to 475° F. for a time in the range from about 3 minutes to about 2 hours, to produce a caramel-like material by pyrolytic decomposition. The heat treatment should be conducted for a period of time sufficient to cause about a 5 to 25 weight percent loss in weight, based on the original weight of the polysaccharide. It is preferable that the heat treatment be regulated to provide a weight loss of about 10 to 22 weight percent. Heat degradation products of this nature derived from sucrose are darkened by the heat treatment, are not sweet to the taste and are essentially soluble in water.

As another alternative, the heat degradation may be accomplished by heat digestion of an alkaline aqueous solution of such saccharide at a temperature of about 220° to 310° F.

If desired, the saccharide may be heated in the presence of a suitable amount (e. g., 1 to 10 weight percent) of a modifying material, digestion aid, etc. or a mixture of such materials. Thus, a fluxing agent such as glycerol, glycol ethers (e. g., the dimethyl ether of tetraethylene glycol, the diethyl ether of triethylene glycol, etc.) may be added to the saccharide prior to digestion in order to increase the fluidity of the melted and decomposing saccharide. Also, oxidizing agents such as nitric acid, etc. may be utilized during the digestion operation. Reactants such as formaldehyde, etc. may be employed as may other conventional additives such as ammonia, ammonium chloride, etc.

Generally speaking, satisfactory results are obtained through the use of about 1 to 15 pounds of starch and about 0.5 to 10 pounds of additive per 42 gallon barrel of mud. It is to be understood, of course, that the amount of starch and the amount of additive required to give the desired reduction in filtration loss from a suspension of finely divided solids in an aqueous liquid vehicle will vary with circumstances over a comparatively wide range, in that the amounts of starch and additive to be employed in a specific suspension or dispersion will depend upon the characteristics of the material to be treated and the circumstances under which it is employed.

The starch and additive may be incorporated into the drilling mud in any of the suitable manners known to those skilled in the art. As a specific example of the practice of the present invention it may be desirable to employ aqueous solutions of starch and the additive. The solutions may then be incorporated with the aqueous dispersion or suspension of the finely divided solids. If desired, the starch or additive, or both, may be directly incorporated in undiluted form in any suitable manner. It is sometimes desirable to use pre-digested starches of improved solubility in order to facilitate mud preparation and maintenance.

When it is desired to reduce the filtration rate of the drilling mud, the materials aforementioned or solutions thereof may be incorporated into the mud at any suitable point in the mud circulation system such as in the mud pit. In some situations it may be desirable to use a mixing device such as a cone and jet mixer or the equivalent thereof for incorporating the starch and additive into the drilling mud.

The present invention may also be considered in connection with the following examples which are given by way of illustration and which are not intended as limitations on the scope of this invention.

EXAMPLE 1

The filtration rate of drilling mud is not reduced when the heat degradation products of the present invention are added thereto in the absence of starch. This is shown by the results obtained with a drilling mud prepared by incorporating clay, in this instance a commercial blend of crude native Texas bentonite (crude calcium montmorillonite) with Wyoming bentonite (sodium montmorillonite) into a saline medium.

Thus, a drilling mud composition was prepared comprising about 22 weight percent of the commercial clay and about 78 weight percent of a 5% salt solution. A portion of the drilling mud was tested for viscosity, initial gel strength and filtration rate. Other portions of the drilling mud were modified by the addition of a heat degraded sucrose prepared by pyrolytic decomposition of sucrose over an open flame for a period of time sufficient to cause a loss of weight of about 17 to 21 weight percent, based on the original weight of the sucrose. Other portions of the drilling mud were modified by the addition of both sodium hydroxide and the heat degraded sugar while still further portions of the drilling mud were modified by the incorporation of sodium hydroxide alone. The modified compositions were also tested for viscosity, initial gel strength and filtration rate. The compositions prepared and the results obtained are set forth in Table I.

Table I.—*Effects obtained by adding heat degraded surcose, sodium hydroxide and mixtures thereof to a drilling mud free from starch*

| Composition | NaOH Added (as 40% solution), Lb./Bbl. | Heat Degraded Sucrose Added (as 50% solution), Lb./Bbl. | Viscosity at 600 R. P. M., cps. stormer | Initial Gel, grams stormer | API Filtration Rate, cc. in 30 Min. |
|---|---|---|---|---|---|
| 1 | 0 | 0 | 9.0 | 8 | 48.3 |
| 2 | 0 | 1 | 7.3 | 4 | 51.8 |
| 3 | 0 | 2 | 6.5 | 3 | 58.4 |
| 4 | 0 | 4 | 7.0 | 2 | 64.5 |
| 5 | 0 | 8 | 6.5 | 2 | 73.0 |
| 6 | .25 | 4 | 7.3 | 4 | 53.0 |
| 7 | .5 | 4 | 8.0 | 3 | 56.5 |
| 8 | 1.0 | 4 | 10.0 | 5 | 65.5 |
| 9 | 2.0 | 4 | 8.0 | 1 | 56.8 |
| 10 | 4.0 | 4 | 8.0 | 1 | 48.7 |
| 11 | .25 | 0 | 14.0 | 14 | 50.1 |
| 12 | .5 | 0 | 20.7 | 20 | 59.0 |
| 13 | 1.0 | 0 | 56 | 50 | 77 |
| 14 | 2.0 | 0 | 58 | 55 | 82 |
| 15 | 4.0 | 0 | 47 | 40 | 89 |

From Table I it will be seen that the unmodified drilling mud (composition 1) had a filtration rate of about 48.3 cc. of water in 30 minutes and that the addition of 1 to 8 pounds per 42 gallon barrel of the heat degraded sucrose (compositions 2 to 5) adversely affected the filtration rate. With respect to compositions 6 to 10, it is seen that the addition of 4 pounds per barrel of degraded sucrose and varying amounts of sodium hydroxide was likewise ineffective with respect to a reduction in filtration rate. Finally, with respect to compositions 11 to 15 it is seen that the addition of sodium hydroxide alone was also ineffective.

EXAMPLE 2

As stated, in order to obtain a material reduction in filtration rate in accordance with the present invention, it is necessary that starch be present in the drilling mud to which the water soluble heat degradation product is added.

By way of illustration, a drilling mud was prepared comprising about 20 weight percent of the commercial clay of Example 1, about 78.5 weight percent of a 5% salt solution, about 0.5% sodium carbonate, and about 1% of starch. Various amounts of the heat degraded sucrose of Example 1, sodium hydroxide and mixtures thereof were added to portions of the thus prepared drilling mud. The unmodified and modified compositions were tested for viscosity, initial gel strength and filtration rate. The compositions prepared and the results obtained are set forth in Table II.

*Table II.—Filtration rate reduction obtainable by adding heat degraded sucrose, sodium hydroxide and mixtures thereof to a starch-containing drilling mud*

| Composition | NaOH Added (as 40% solution), Lb./Bbl. | Heat Degraded Sucrose Added (as 50% solution), Lb./Bbl. | Viscosity at 600 R. P. M., cps. stormer | Initial Gel, grams stormer | API Filtration Rate, cc. in 30 Min. |
|---|---|---|---|---|---|
| 16 | 0 | 0 | 22.0 | 12 | 66.0 |
| 17 | 0 | 4 | 14.5 | 1 | 26.1 |
| 18 | .25 | 4 | 15.7 | 2 | 13.3 |
| 19 | .5 | 4 | 15.7 | 2 | 9.4 |
| 20 | .25 | 0 | 26.5 | 23 | 65.6 |
| 21 | .5 | 0 | 30.0 | 20 | 52.0 |
| 22 | 1.0 | 0 | 27.5 | 13 | 53 |
| 23 | 1.0 | 4 | 17.7 | 2 | 24.7 |

From Table II it is seen that the addition of 4 pounds of heat degraded sucrose per barrel of drilling mud (composition 17) resulted in the formation of the drilling mud having about ⅓ of the filtration rate of the unmodified drilling mud (composition 16). With respect to compositions 18 and 19 it is seen that the addition of both sodium hydroxide and the heat degraded sucrose resulted in a still further reduction in filtration rate. However, as shown by compositions 20 to 22, the addition of sodium hydroxide to the starch-containing drilling mud in the absence of heat degraded sucrose did not cause a reduction in filtration rate. Composition 23 shows, again, the beneficial results obtainable through the use of both sodium hydroxide and heat degraded sucrose.

EXAMPLE 3

The addition of a saccharide, per se, which has not been degraded in accordance with the present invention will not materially reduce filtration rate.

By way of example, a drilling mud base was prepared comprising about 27 weight percent of commercial clay of Example 1, about 83 weight percent of a 25% salt solution, and about 1 weight percent of starch and about 0.5 weight percent of sodium carbonate (based on the clay and salt water) was added thereto. A portion of the thus prepared drilling mud was tested for viscosity, initial gel strength and filtration rate. Another portion of the modified base was modified by the addition of about 4 pounds per 42 gallon barrel of mud of sucrose and the thus modified portion was similarly tested. A third portion of the drilling mud was modified by the addition of 4 pounds per 42 gallon barrel of mud of the heat degraded sucrose of Example 1 and was likewise tested. The compositions prepared and the results obtained are set forth in Table III.

*Table III.—Comparison of the properties of starch-containing drilling muds modified by the addition of sucrose and heat degraded sucrose*

| Composition | Sucrose Added, Lb./Bbl. | Heat Degraded Sucrose Added, Lb./Bbl. | Viscosity at 600 R. P. M., cps. stormer | Initial Gel, Grams Stormer | API Filtration Rate, cc. in 30 Min. |
|---|---|---|---|---|---|
| 24 | 0 | 0 | 23 | 0 | 34.3 |
| 25 | 4 | 0 | 20 | 0 | 32.3 |
| 26 | 0 | 4 | 21 | 0 | 22.7 |

From Table III it is seen that the addition of sucrose (composition 25) did not materially change filtration rate (as compared with unmodified composition 24) but that a material reduction in filtration rate was obtained in the case of composition 26 through the use of the heat degraded sucrose.

EXAMPLE 4

As another example, a drilling mud was prepared comprising about 20 weight percent of the commercial clay of Example 1, about 78.5 weight percent of a 5% salt solution, about 1 weight percent of starch and about 0.5 weight percent of sodium carbonate. A portion of the thus-prepared drilling mud was tested for viscosity, gel strength and filtration rate. Another portion of the drilling mud was modified through the addition of about 2 pounds per barrel of a heat degradation product obtained by heating sucrose to a weight loss of about 19%. A third portion of the drilling mud was modified through the addition of about 2 pounds per barrel of a heat degradation product obtained by heating anhydrous dextrose to a weight loss of about 14.5%. The compositions prepared and tested and the results obtained are set forth in the following table.

*Table IV.—Filtration rate reduction obtainable through the addition of heat degraded sucrose and dextrose*

| Composition | Source of Heat Degradation Product | Amount of Heat Degradation Product Added, Lb./Bbl. | Viscosity at 600 R. P. M., cps. stormer | Initial Gel Strength, Grams Stormer | Filitration Rate, cc. in 30 Minutes, API |
|---|---|---|---|---|---|
| 27 | | | 17.7 | 11 | 54.4 |
| 28 | Sucrose (19% wt. loss). | 2.0 | 15.3 | 7 | 30.1 |
| 29 | Dextrose (14.5% wt. loss). | 2.0 | 15.0 | 7 | 32.6 |

From Table IV it is seen that in each instance the addition of a heat degraded saccharide caused a substantial reduction in filtration rate.

EXAMPLE 5

As a further example, a drilling mud was prepared comprising about 20 weight percent of the commercial clay of Example 1, about 78.5 weight percent of a 5% salt solution, about 1% of starch and about 0.5% of sodium carbonate (a dispersing agent). Various amounts of the heat degraded sucrose of Example 1 were added to portions of the drilling mud. The unmodified and modified drilling mud compositions were tested for viscosity, initial gel strength and filtration rate. The compositions prepared and tested and the results obtained are set forth in Table V.

Table V.—*Filtration rate reduction obtainable by adding heat degraded sucrose to a starch-containing drilling mud*

| Composition | Heat Degraded Sucrose Added, Lb./Bbl. | Viscosity at 600 R. P. M., cps. stormer | Initial Gel, Grams Stormer | API Filtration Rate, cc. in 30 Min. |
|---|---|---|---|---|
| 30 | 0 | 39 | 30 | 33.9 |
| 31 | 1 | 30 | 15 | 26.7 |
| 32 | 2 | 31 | 13 | 21.9 |
| 33 | 4 | 27 | 10 | 16.0 |
| 34 | 8 | 24 | 5 | 12.5 |

From Table V it is seen that the filtration rate was reduced in each instance and, in addition, that the filtration rate was progressively reduced as increasing amounts of heat degraded sugar were added to the drilling mud. Thus, it is to be noted that the filtration rate of composition 34, containing about 8 pounds per barrel of heat degraded sucrose had about one-half the filtration rate of composition 31 containing about 1 pound per barrel of heat degraded sucrose and about one-third of the filtration rate of control composition 30 which contained no heat degraded sucrose.

EXAMPLE 6

Satisfactory results are obtained in accordance with the present invention even when the drilling mud comprises an aqueous medium which is substantially completely saturated with salt. As an example, a drilling mud was prepared comprising about 27 weight percent of the commercial clay of Example 1, about 71 weight percent of an aqueous medium having about 25 weight percent of salt dissolved therein, about 1% of starch and about 1% of sodium carbonate dispersant. Portions of the thus prepared drilling mud were modified through the addition of the heat degraded sucrose of Example 1. The unmodified and modified drilling muds were tested for viscosity, initial gel strength and filtration rate. The compositions prepared and the results obtained are set forth in Table VI.

Table VI.—*Filtration rate reduction obtainable by adding heat degraded sucrose to the drilling mud containing salt saturated water*

| Composition | Heat Degraded Sucrose Added (as a 50% solution), Lb./Bbl. | Viscosity at 600 R. P. M., cps. stormer | Initial Gel, Grams Stormer | API Filtration Rate, cc. in 30 Min. |
|---|---|---|---|---|
| 35 | 0 | 23 | 0 | 42.6 |
| 36 | 1 | 23 | 0 | 33.2 |
| 37 | 2 | 23 | 0 | 30.5 |
| 38 | 4 | 24 | 0 | 26.1 |

From Table VI it is seen that the drilling mud composition containing heat degraded sucrose (compositions 36 to 38) had a substantially lower filtration rate than the unmodified control composition 35 and that composition 38 which contained 4 pounds per 42 gallon barrel of heat degraded sucrose had a lower filtration rate than composition 36 which contained only 1 pound per barrel of sucrose.

EXAMPLE 7

In accordance with the present invention it is contemplated that the pyrolytic heat degradation of sucrose may also be accomplished in the presence of modifying agents, digestion aids, etc. This is shown by the results obtained by the pyrolysis of sucrose, both with and without the addition of such materials. The various degraded sucroses were then utilized as additives for a drilling mud comprising about 20 weight percent of the commerical clay of Example 1 and about 78.5 weight percent of the 5% salt solution, about 1% by weight of starch and about 0.5% by weight of sodium carbonate. The unmodified and modified compositions were tested for viscosity, initial gel strength and filtration rate. The source of degraded sucrose is set forth in Table VII and the compositions prepared and the results obtained are set forth in Table VIIA.

Table VII.—*Reduction in filtration rate obtainable with a variety of heat degraded sucrose compositions*

| Composition | Source of Heat Degraded Sucrose | Material Added to Sucrose Before Heating (in Weight Percent Based on Sucrose) | Weight Loss by Sucrose on Heating Percent |
|---|---|---|---|
| 39 | | | |
| 40 | Pyrolysis of sucrose. | Nothing | 12.5 |
| 41 | ----do---- | 5% aqua ammonia | 19.5 |
| 42 | ----do---- | 5.9% glycerol | (2) |
| 43 | ----do---- | 3.5% conc. HNO₃ [1] | 10.5 |
| 44 | ----do---- | 3% glycerol and 3.5% conc. HNO₃ [1] | 13.6 |
| 45 | ----do---- | 3% glycerol and 7.0% conc. HNO₃ [1] | 12.6 |
| 46 | ----do---- | 2.5% ammonium chloride | 11.4 |
| 47 | ----do---- | 3% glycerol and 10% formalin | 21.3 |
| 48 | | | |
| 49 | Pyrolysis of sucrose. | Nothing | 9.8 |
| 50 | ----do---- | ----do---- | 12.5 |
| 51 | ----do---- | ----do---- | 21.0 |
| 52 | ----do---- | Ammonia | 19.5 |
| 53 | ----do---- | Dimethylether of tetraethylene glycol. | 19 |
| 54 | ----do---- | 6.7% glycerol | 19 |

[1] Nitric acid consumed in oxidation before added free water had evaporated.
[2] Heat degraded sucrose produced in flask submerged in 450° F. oil bath.

Table VIIA.—*Reduction in filtration rate obtainable with a variety of heat degraded sucrose compositions*

| Composition | Heat Degraded Sucrose Added, Lb./Bbl. (based on Sucrose Heated) | Mud Properties | | |
|---|---|---|---|---|
| | | Viscosity at 600 R. P. M. cps. Stormer | Initial Gel Strength Grams Stormer | API Filtration Rate, cc. in 30 Min. |
| 39 | 0 | 19.5 | 11 | 52.8 |
| 40 | 2 | 16.5 | 6 | 27.0 |
| 41 | 2 | 16.0 | 4 | 22.0 |
| 42 | 2 | 16.0 | 3 | 23.1 |
| 43 | 2 | 16.5 | 5 | 26.6 |
| 44 | 2 | 16.0 | 3 | 22.9 |
| 45 | 2 | 16.0 | 4 | 25.5 |
| 46 | 2 | 16.0 | 4 | 29.5 |
| 47 | 2 | 16.0 | 3 | 23.6 |
| 48 | 0 | 20.3 | 12 | 52.2 |
| 49 | 2 | 18.5 | 7 | 32.0 |
| 50 | 2 | 17.7 | 5 | 26.8 |
| 51 | 2 | 15.7 | 3 | 22.2 |
| 52 | 2 | 16.0 | 5 | 20.9 |
| 53 | 2 | 16.5 | 4 | 21.3 |
| 54 | 2 | 16.5 | 4 | 24.0 |

From Table VIIA it is seen that in each instance the addition of the heat degraded sucrose composition caused a substantial reduction in filtration rate as compared with the unmodified compositions 39 and 48. It is to be further noted that none of the chemical agents added to the suger before pyrolysis had an appreciable effect on action of the products filtration rate or other tested properties of the drilling mud.

EXAMPLE 8

As has been indicated, the saccharides of the present invention may also be digested in aqueous alkaline solution.

By way of illustration, a drilling mud was prepared comprising 20 weight percent of the commercial clay of Example 1 and 80% of an aqueous vehicle containing 5 weight percent of dissolved salt; the drilling mud containing in addition about 1 weight percent of starch and about 0.5 weight percent of sodium carbonate. There was also prepared a plurality of 50% aqueous sucrose solutions to which various amounts of a 40% solution of sodium hydroxide was added; the thus prepared solutions being heated for various lengths of time. The thus degraded sucrose compositions were then used as additives for the drilling mud composition. The derivation of the heat degraded sucrose is set forth in Table VIII and the drilling mud compositions prepared and the viscosity, initial gel strength and filtration rate thereof are set forth in Table VIIIA.

*Table VIII.—Filtration rate reduction obtainable through the addition of sucrose degraded in aqueous alkaline solution*

| Composition | Material Added to Stock Mud—Treatment of 50% Sucrose Solutions | | |
|---|---|---|---|
| | Percent of 40% NaOH Solution Added | Temperature of Heating, °C. | Time of Heating, Hours |
| 55 | | | |
| 56 | 7.6 | 135 | 16 |
| 57 | 15.3 | 135 | 16 |
| 58 | 30.5 | 135 | 16 |
| 59 | 6.2 | 132 | 1.5 |
| 60 | 6.2 | 132 | 4.75 |
| 61 | 6.2 | 132 | 7.0 |
| 62 | 6.2 | 132 | 11.5 |
| 63 | 6.2 | 132 | 17.5 |

*Table VIIIA. — Filtration rate reduction obtainable through the addition of sucrose degraded in aqueous alkaline solution*

| Composition | Amount Added to Stock Mud, Lb./Bbl. (Based on Sucrose) | Mud Properties | | |
|---|---|---|---|---|
| | | Viscosity at 600 R. P. M., Cps. Stormer | Initial Gel Strength, Grams Stormer | API Filtration Rate, cc. in 30 Min. |
| 55 | | 17.7 | 11 | 54.4 |
| 56 | 2 | 16.0 | 9 | 48.3 |
| 57 | 2 | 16.0 | 8 | 44.8 |
| 58 | 2 | 16.5 | 8 | 43.3 |
| 59 | 2 | 16.5 | 10 | 48.0 |
| 60 | 2 | 16.5 | 9 | 47.7 |
| 61 | 2 | 16.5 | 8 | 43.5 |
| 62 | 2 | 16.0 | 8 | 33.9 |
| 63 | 2 | 15.0 | 7 | 31.2 |

From Table VIIIA it is seen that the modified drilling mud compositions 56 to 63 had a lower filtration rate than the unmodified composition 55. With respect to compositions 56 through 58 it is seen that with a constant heating time, the amount of caustic present in the sucrose solution did not have a material bearing on the filtration rate reduction. It is to be noted, however, that the time of heating is material as shown by the results obtained with respect to the compositions 59 to 63, for in this instance with a constant amount of caustic, the filtration rate was reduced as the time of heating was increased. It is also to be noted that compositions 59 and 60 wherein 6.2 weight percent of caustic was added to the original sucrose solution and heated for less than 10 hours, filtration rate was substantially the same as that obtained with respect to compositions 56 to 58 wherein larger amounts of caustic were added.

The nature and objects of the present invention having been fully described and illustrated, what is claimed is:

1. A drilling mud comprising at least 5% by weight of finely divided solids in an aqueous medium to which has been added about 1 to 15 pounds of starch per 42 gallon barrel of drilling mud and from about 0.5 to 10 pounds per 42 gallon barrel of drilling mud of a heat degradation product of a saccharide contining 1 to 4 combined sugar units in amounts sufficient to materially reduce the tendency of the drilling mud to lose water by filtration, said heat degradation product being selected from the group consisting of (1) the product obtained by heating said saccharide in solid form at a temperature of about 375° to about 475° F. for a time within the range of about 3 minutes to 2 hours sufficient to cause a weight loss of about 5 to 25 weight percent, based on the original weight of said saccharide and (2) heat degradation products obtained by heat digestion of an aqueous alkaline solution of said saccharide at a temperature within the range of about 220° to about 310° F.

2. A drilling mud comprising at least 5% by weight of finely divided solids in an aqueous saline medium to which has been added about 1 to 15 pounds of starch per 42 gallon barrel of drilling mud and from about 0.5 to 10 pounds per 42 gallon barrel of drilling mud of water soluble heat degradation product of a saccharide containing 1 to 4 combined sugar units, said starch and said heat degradation product being added in amounts sufficient to substantially reduce the tendency of the drilling mud to lose water by filtration, said heat degradation product being selected from the group consisting of (1) the product obtained by heating said saccharide in solid form at a temperature of about 375° to about 475° F. for a time within the range of about 3 minutes to 2 hours sufficient to cause a weight loss of about 5 to 25 weight percent, based on the original weight of said saccharide and (2) heat degradation products obtained by heat digestion of an aqueous alkaline solution of said saccharide at a temperature within the range of about 220° to about 310° F.

3. A drilling mud as in claim 2 wherein the heat degradation product is the heat degradation product of a monosaccharide.

4. A drilling mud as in claim 3 wherein the monosaccharide is dextrose.

5. A drilling mud as in claim 2 wherein the heat degradation product is the heat degradation product of a disaccharide.

6. A drilling mud as in claim 2 wherein the heat degradation product is the heat degradation product of sucrose.

7. A drilling mud as in claim 6 wherein the heat degradation product is a heat degradation product obtained by heating sucrose in solid form at a temperature within the range of about 375° to 475° F. for a time in the range from about 3 minutes to 2 hours sufficient to cause a weight loss of about 5 to 25 percent, based on the original saccharide, sufficient to cause about a 5 to 25 percent loss of weight, based on the original weight of sucrose.

8. A drilling mud as in claim 6 wherein the heat degradation product is a heat degradation product obtained by the digestion of an aqueous alkaline solution of sucrose, at a temperature within the range of about 220° to about 310° F.

9. In a process for drilling a well with well drilling tools wherein there is circulated in the well a water-based drilling mud containing at least about 5% by weight of finely divided solids, a method of forming a filter cake on the wall of said well to decrease the loss of fluid from said drilling mud contained therein into surrounding earthen formations which comprises admixing with said drilling mud about 1 to 15 pounds of starch per 42 gallon barrel of drilling mud and from about 0.5 to 10 pounds per 42 gallon barrel of drilling mud of a water soluble heat degradation product of a saccharide containing 1 to 4 combined sugar units, said starch and said additive being admixed in amounts sufficient to substantially lower the filtration rate of said mud, and contacting said wall of said well with the thus resulting drilling mud to form said filter cake thereon, said heat degradation product being selected from the group consisting of (1) the product obtained by heating said saccharide in solid form at a temperature of about 375° to about 475° F. for a time within the range of about 3 minutes to 2 hours sufficient to cause a weight loss of about 5 to 25 weight percent, based on the original weight of said saccharide and (2) heat degradation products obtained by heat digestion of an aqueous alkaline solution of said saccharide at a temperature within the range of about 220° to about 310° F.

10. A method as in claim 9 wherein an alkali metal hydroxide is also added to said drilling mud.

11. A method as in claim 10 wherein said saccharide is sucrose.

References Cited in the file of this patent

UNITED STATES PATENTS

| | | |
|---|---|---|
| 2,364,434 | Foster | Dec. 5, 1944 |
| 2,604,447 | Cummer et al. | July 22, 1952 |
| 2,660,561 | Watkins | Nov. 24, 1953 |
| 2,713,030 | Brink et al. | July 12, 1955 |